United States Patent [19]

Garrett

[11] 4,205,600
[45] Jun. 3, 1980

[54] DEEP FAT FRYER AND PRODUCT INFEED

[76] Inventor: Buford C. Garrett, 412 Brook Glenn Rd., Taylors, S.C. 29687

[21] Appl. No.: 14,752

[22] Filed: Feb. 23, 1979

[51] Int. Cl.$^2$ .............................................. A47J 37/12
[52] U.S. Cl. ...................................... 99/341; 99/355; 99/407; 99/408; 99/410
[58] Field of Search ................. 99/403, 408, 407, 336, 99/341, 404, 410, 411, 355, 357, 443 C

[56] References Cited

U.S. PATENT DOCUMENTS

| | | | |
|---|---|---|---|
| 1,472,205 | 10/1923 | Brunner | 99/411 |
| 3,036,513 | 5/1962 | Reeves | 99/404 |
| 3,296,954 | 1/1967 | Haub | 99/404 |
| 3,357,341 | 12/1967 | Kocken | 99/407 |
| 3,448,677 | 6/1969 | Dexters | 99/336 |
| 3,474,726 | 10/1969 | Curtin | 99/404 |
| 3,645,196 | 2/1972 | Johnston | 99/404 |
| 3,685,432 | 8/1972 | Hoeberigs | 99/443 C |

*Primary Examiner*—Billy J. Wilhite
*Attorney, Agent, or Firm*—B. P. Fishburne, Jr.

[57] ABSTRACT

Quadrant baskets are indexed within a stationary vertical axis cylindrical cooking vessel which contains hot cooking oil. The baskets dwell after each quarter turn indexing. One-quarter of the total required cooking time for the product elapses at each of the four dwell positions of the baskets. An auger-type product infeed unit at the first cooking position is actuated to open gates thereof and deliver a proper amount of the food product to each basket. At the fourth cooking position, each basket is vertically elevated by a linear actuator and the cooked product slides by gravity from an open side of each basket into a retriever basket located at the fourth cooking position outside of the cooking vessel which can be lifted and removed through a window forming part of an enclosure for the deep fryer which prevents contaminated vapors from re-entering the cooker.

20 Claims, No Drawings

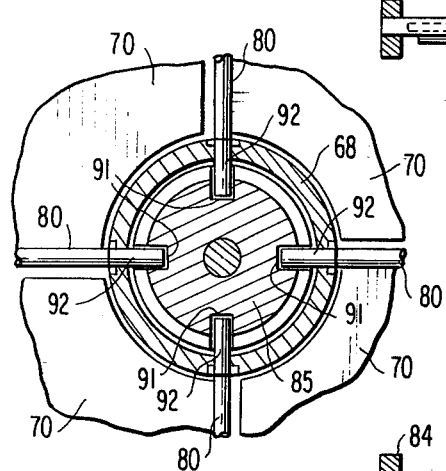
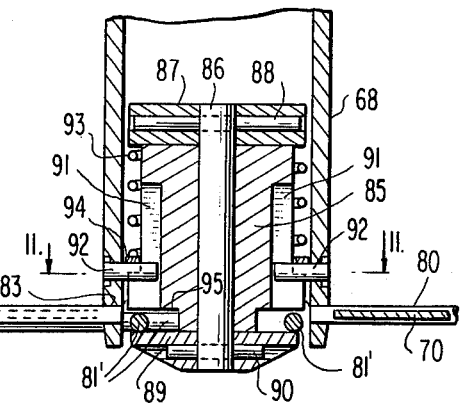
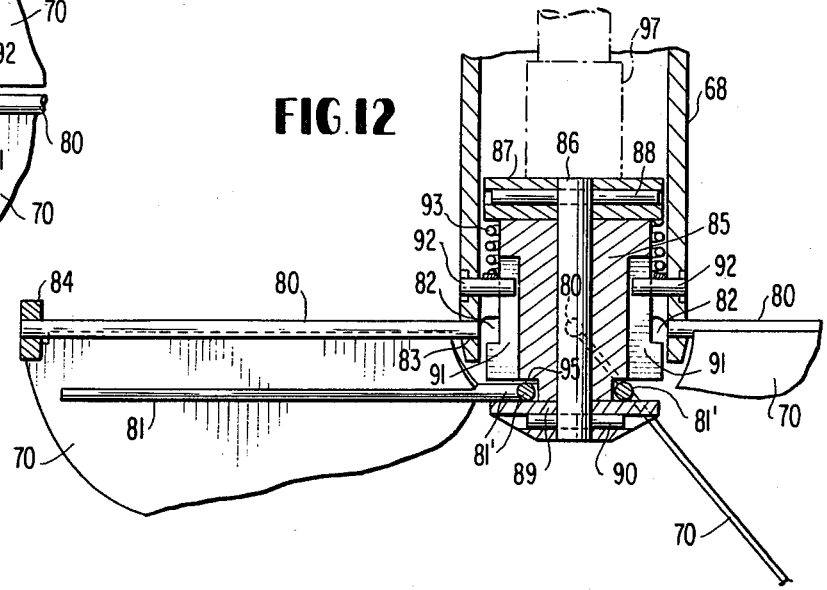
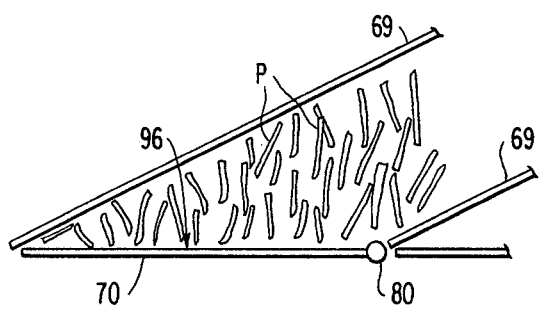
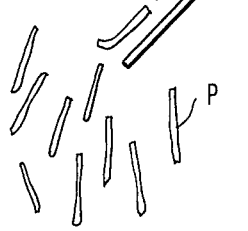

DEEP FAT FRYER AND PRODUCT INFEED

BACKGROUND OF THE INVENTION

Deep fat fryers, broadly speaking, are known in the prior art. U.S. Pat. No. 3,296,954 shows an example of such a prior art machine which includes product cooking baskets adapted to be indexed in a circular path by operation of a vertical axis drive relative to a cooking tank.

The objective of the present invention is to improve on deep fryers of this class through the provision of a machine which is considerably more compact and less complex in construction and therefore more operationally efficient, and less costly to maintain.

Another object of the invention is to provide in a deep fryer for french fried potatoes and the like a simplified and reliable product infeed device, whereby at one cooking position or station of the machine a predetermined amount of the food product is delivered to each of four quadrant cooking baskets which are indexed in succession to three other cooking positions at which the baskets dwell for sufficient periods of time to cook the product in each basket at the end of the fourth period of dwell, where each basket is elevated to release the cooked product into a retriever basket at the fourth and final cooking position.

Another objective of the invention is to provide in a vertical axis rotary deep fryer a unique quadrant basket configuration, whereby upon raising of each basket at the product discharge station, the peripheral open side of each basket becomes exposed so that the cooked product can slide by gravity from an inclined bottom wall of the basket into the adjacent retriever basket.

Another object is to provide in a deep fryer of the mentioned class a unique coaction between the product infeed means and the individual cooking baskets, whereby the incoming food product will be deflected outwardly from the interior of the cooking basket toward a large cooking zone where the product will float in cooking oil and will be prevented from returning to the product inlet area of the basket.

Another major area of improvement over the prior art and an object of the invention is the provision of an enclosure for the deep fryer which will preclude the return of contaminated vapors or drippings back into the cooker once they have escaped from the same, thus eliminating a possible health hazard.

Other known United States patents of general interest which do not disclose the above enumerated and other novel features of the invention are made of record herein under 37 C.F.R. 1.56, as follows: U.S. Pat. Nos. 1,472,205; 3,357,341; 3,448,677 and 3,645,196.

BRIEF DESCRIPTION OF THE DRAWINGS

FIG. 10 is a fragmentary vertical section showing auger gate operating mechanism in a retracted position.

FIG. 11 is a horizontal section taken on line 11—11 of FIG. 10.

FIG. 12 is a view similar to FIG. 10 showing the gate operating mechanism in the extended open gate position.

FIG. 13 is a partly diagrammatic fragmentary elevational view of an auger flight gate in the closed product retaining position.

FIG. 14 is a similar view showing the gate in the open product releasing position.

DETAILED DESCRIPTION

Figure 1:
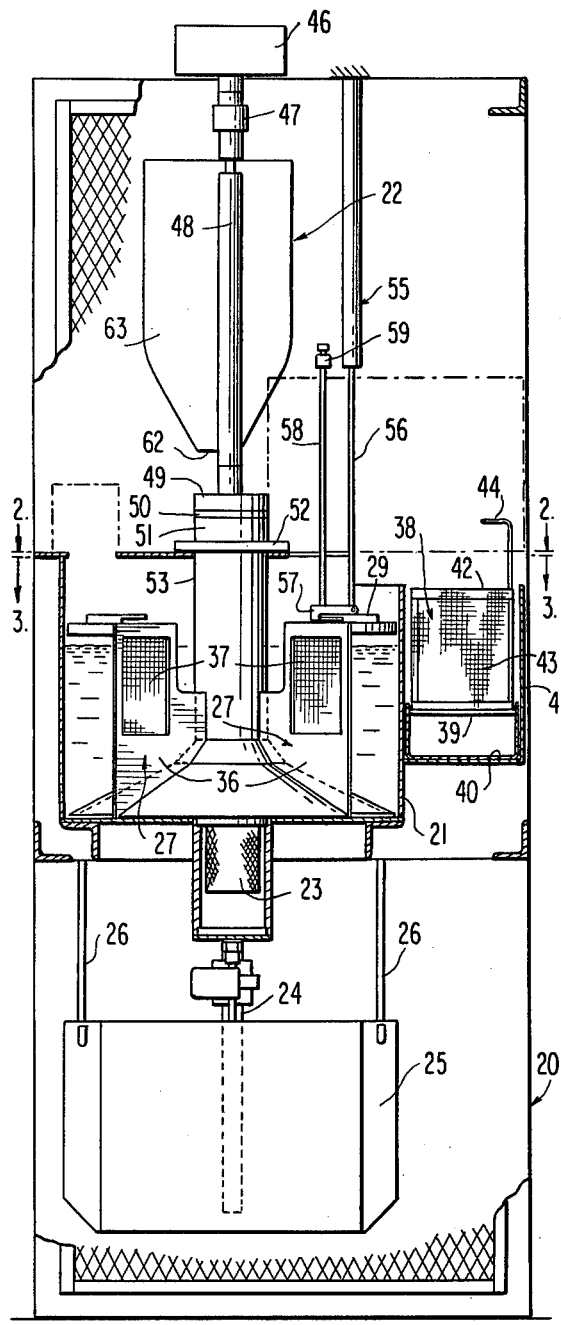
FIG. 1 is a fragmentary side elevation of the invention, partly in section and partly broken away.

Referring to the drawings in detail wherein like numerals designate like parts, the machine comprises a main support frame and enclosure 20 for a stationary vertical axis open top cylindrical cooking vessel 21 held near the vertical center of the frame 20 and a coacting power driven food product input unit 22 near the top of the support frame. The cooking vessel 21 is equipped with bottom and side wall heating coils, not shown, to heat the cooking oil bath in the vessel to the necessary temperature during the operation of the machine. At its bottom, the vessel 21 has a strainer 23 for the cooking oil when the latter at proper intervals is drained through a draining means 24 into a reservoir or sump 25 supported by hanger rods 26 in a lower chamber of the support frame and enclosure 20.

Within the cylindrical cooking vessel 21 are four identical quadrant baskets 27 to receive and hold the food product undergoing deep frying, such as french fried potatoes or some similar product. Each quadrant basket 27 includes a top wall portion 28 carrying a flat horizontal lifting element 29 rigid therewith for coaction with a basket raising and lowering means, to be described. Each basket further comprises an arcuate vertical baffle plate 30 dependingly secured to its top wall portion 28 and being concentrically arranged with an interior arcuate comparatively short side wall portion 31 closely surrounding an arcuate interior enclosure wall 32 forming part of an enclosure system, to be described. The interior side wall 31 of each basket 27 is joined near its bottom to a steeply sloped wall or panel 33 also of arcuate formation and preferably disposed at an angle of about 60 degrees to the horizontal. At its lower edge, the panel 33 is joined to a less steeply sloped and perforated basket bottom wall 34 preferably inclined at about 25 degrees to the horizontal and having its exterior marginal edge 35 fitting closely inside of the cylindrical side wall of cooking vessel 21.

Each basket 27 additionally comprises vertical side walls 36 which extend radially in the vessel 21 and the radial side walls 36 have large screen mesh panels 37 constructed therein. A key feature of the invention resides in the fact that the cooking and conveying baskets 27 are entirely open from top-to-bottom and from side-to-side at their outer peripheries facing the cylindrical side wall of cooking vessel 21. Thus, as long as the baskets 27 are down inside of the vessel 21, the food product cannot escape from the basket whose open side is in close proximity to the cooking vessel side wall. However, when each basket 27 is elevated to a product discharge position shown in FIG. 4, the cooked product, such as french fries, will slide from the basket 27 by gravity and into an open top rectangular retriever basket 38 positioned at the front of the deep fryer at a convenient elevation close to the stationary cooking vessel 21.

At the product discharge and retrieval station, the large rectangular basket 38 is seated on spaced horizontal rods 39 of a drain pan 40 held in a support structure 41 suitably fixed to the main frame 20 and/or cooking vessel 21. The retriever basket 38 includes a suitable frame 42 and large screen panel side walls 43. A lifting handle 44 for the retriever basket 38 rises above the outer side thereof, as shown. The bottom of the basket 38 also contains large screen panel areas 45.

During the cooking cycle, the four baskets 27 are driven in rotation around the interior of the cooking vessel 21 intermittently in steps of 90 degrees followed by dwell periods of sufficient duration to provide one-fourth of the required cooking time during each dwell. A rotary actuator 46 for the baskets 27 is provided at the top of the machine and is connected with conventional controls, not shown, to stop and start the actuator at desired times to produce the described movements and dwells of the baskets 27 in the vessel 21. The rotary actuator 46 is coupled through a coupling 47 with a flexible drive shaft assembly 48 which can be adjusted to avoid interference with the fixed product infeed unit 22 disposed in offset relationship to the vertical axis of the vessel 21 at one side of the machine. The drive shaft 48 is coupled with a rotor thrust bearing ring 49, riding on a thrust bearing 50 seated on a bearing block 51, in turn fixed to a rotor support plate 52 held on the main frame 20 of the machine. Below the support plate 52, a rotor assembly 53 in the form of a cylindrical column is disposed in close relationship to the interior wall portions 31 of the baskets 27 when the baskets are down in the vessel 21. The perforated bottom walls 34 of the baskets which are conical rest on a broad conical base wall 54 at the bottom of the rotor assembly 53 and rotating in the bottom of the vessel 21 under influence of the intermittent actuator 46.

Figure 4:
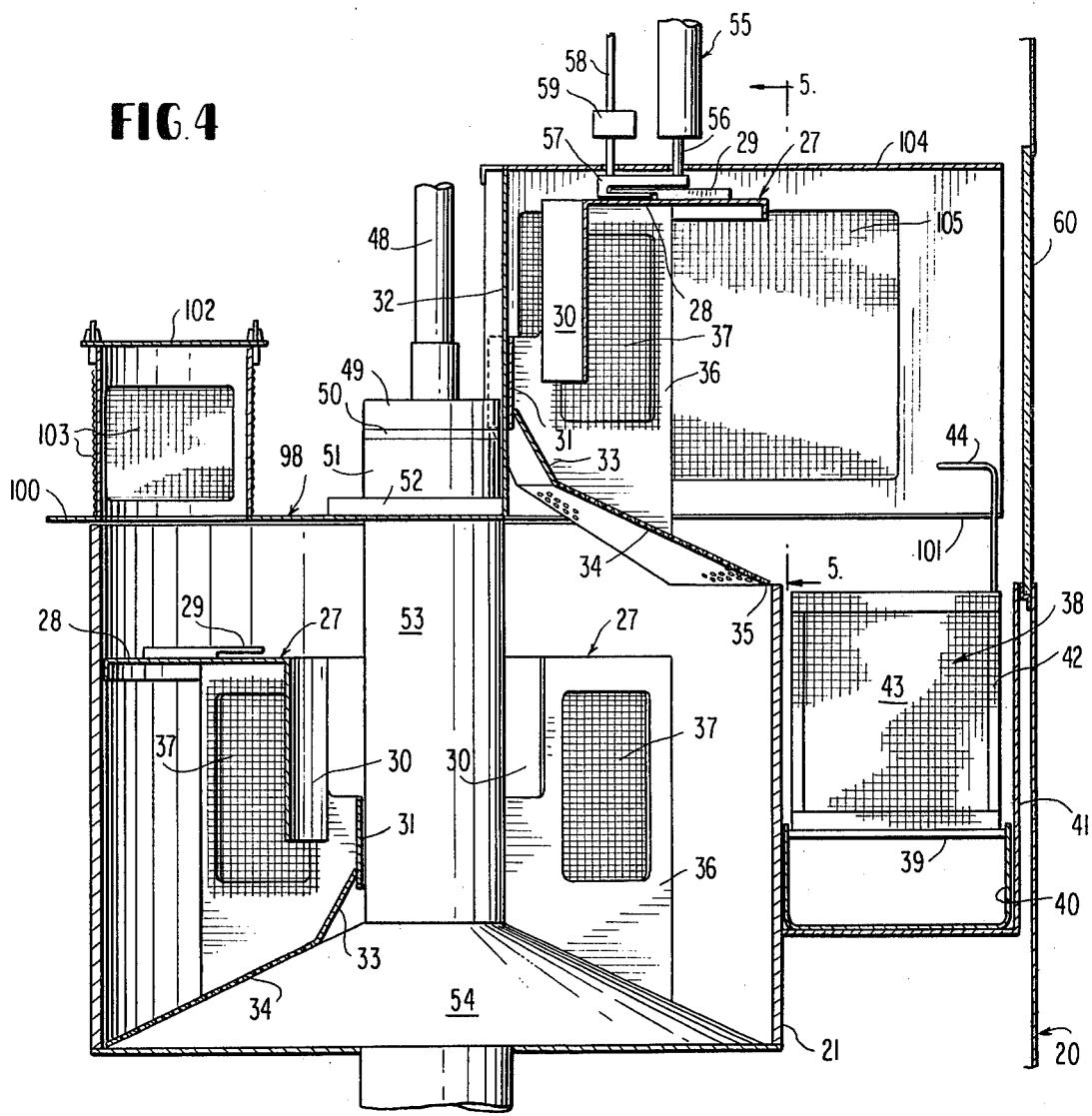
FIG. 4 is an enlarged vertical section taken through the deep fryer at the cooked product discharge station and showing one quadrant basket at the elevated automatic discharge position relative to the stationary retriever basket.
Figure 5:
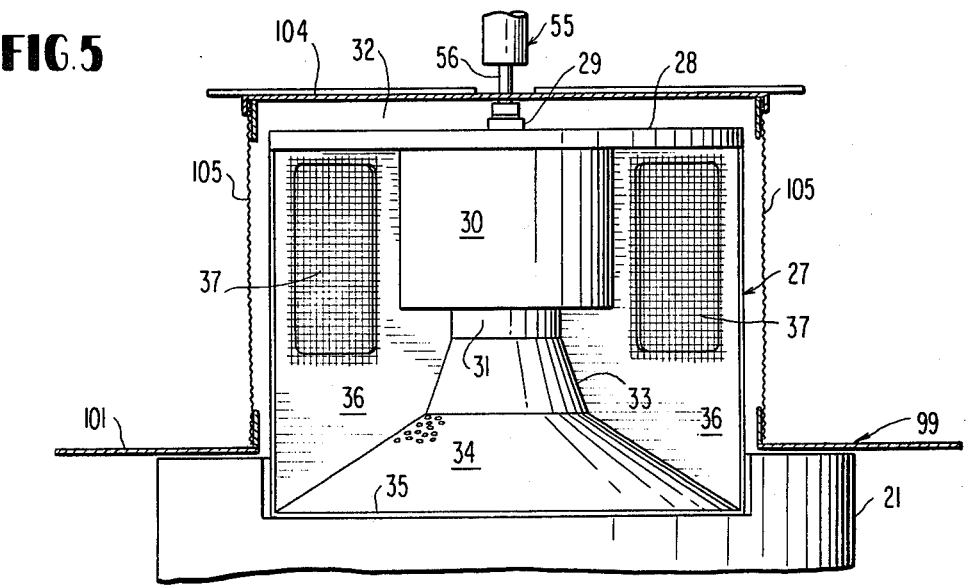
FIG. 5 is a fragmentary vertical section taken on line 5—5 of FIG. 4.

At the cooked product discharge station adjacent the basket 38, a vertical actuator 55 in the form of a double-acting cylinder is provided to elevate each basket 27 in succession to the discharge position shown in FIG. 4 while the rotary actuator 46 is at a dwell. The extensible and retractable rod 56 of vertical actuator 55 carries at its lower end a slotted lifter 57 whose slot receives the lifting element 29 of each basket 27 for lifting the basket straight up and out of the cooking vessel 21 when the rod 56 is retracted into the cylinder 55, FIG. 4. The vertical actuator includes a guide rod 58 parallel to the rod 56 and having its lower end attached to the lifter 57 and being guided through a bore of a guide block 59 fixedly positioned near the lower end of cylinder 55. This arrangement prevents rotation of the lifter 57 around the axis of the rod 56 during the operation of the vertical actuator.

As explained previously, when each basket 27 is in the fully elevated position, FIG. 4, the cooking oil will have drained from the basket into the vessel 21 and the cooked product, such as french fries, will simply slide down the perforated wall 34 and into the open top of retriever basket 38 which can be lifted out of the machine by its handle 44 after first raising a plexiglas window panel 60 provided on the front of the machine. Preferably, the plexiglas panel 60 will be held in the raised position by the action of a magnetic rubber strip on the interior of the enclosure 20, or by equivalent holding means. Suitable fairing 61, FIG. 3, is provided near the interior corners of the retriever basket 38 to guide the discharged product safely from each basket 27 into the retriever basket.

Figure 3:
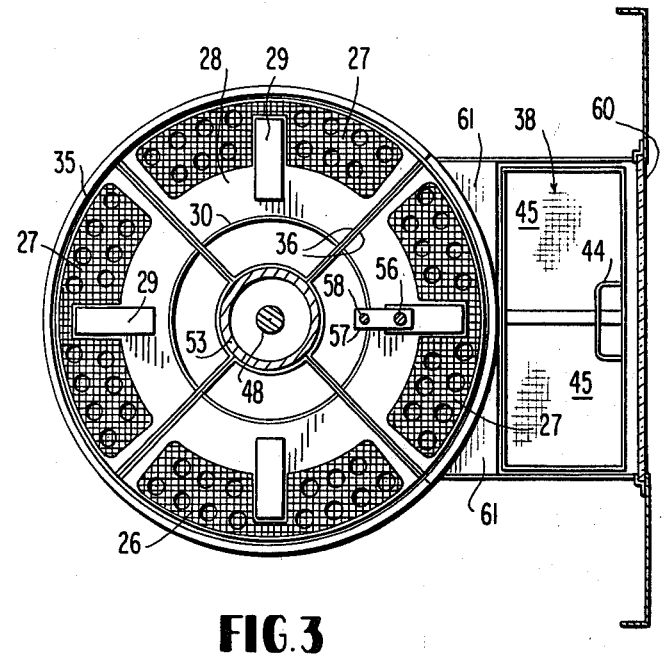
FIG. 3 is a similar section taken on line 3—3 of FIG. 1.

As observed in FIG. 3, the baskets 27 are indexed counterclockwise in incremental steps of 90 degrees. The fourth and final cooking dwell or position is adjacent to the retriever basket 38 where the cooked product is discharged. The first basket position is immediately counterclockwise of the last-named position and the second and third positions follow in the counterclockwise direction. The product infeed unit 22 is located at the first cooking position with its lower end outlet 62, FIG. 6, located above and in vertical alignment with the steeply inclined deflector panel 33 of each basket 27 at the product infeed and first cooking station.

Figure 2:
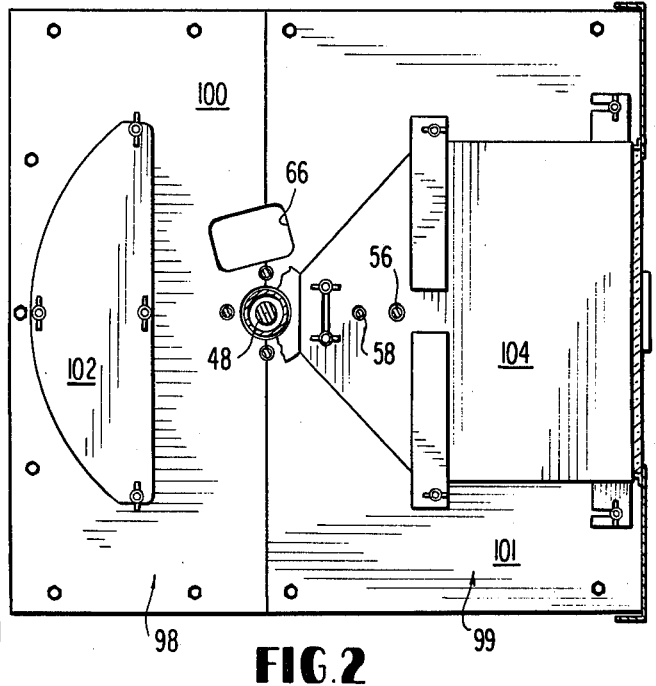
FIG. 2 is an enlarged horizontal section taken on line 2—2 of FIG. 1.
Figure 8:
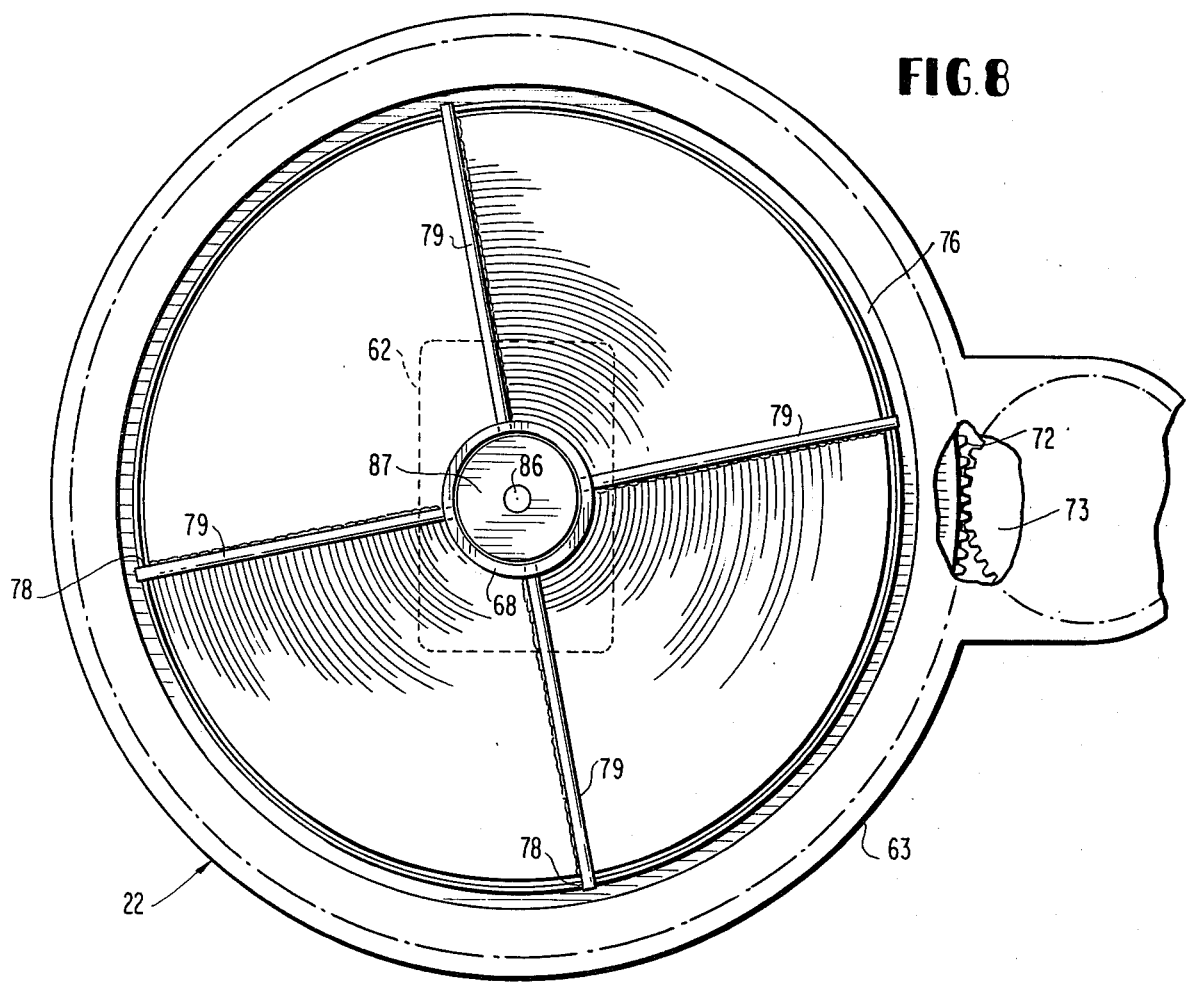
FIG. 8 is a plan view of the infeed unit, partly broken away.

The product infeed unit 22 comprises a stationary vertical axis cylindrical housing 63 supported near its top on a stationary support ring 64 surrounding the housing 63 and suitably connected to the main support and housing 20. The lower discharge end of the infeed unit 22 tapers as at 65 and the discharge opening 62 may be of rectangular form, FIG. 8, for registry with an opening 66 of like form formed in the top of a deep fryer enclosure structure, FIG. 2, yet to be described.

The product infeed unit 22 comprises an auger-type feed rotor 67 within the cylindrical housing 63. The rotor 67 comprises a center tubular shaft 68 mounting four separate helical flights 69 fixed thereon, each having a pivoted gate 70, to be fully described. The auger flights 69 fit closely within the cylindrical housing 63. A ball bearing 71 at the top of the unit 22 has its inner race seated on the support ring 64 and its outer race carries a ring gear 72 driven by a vertical axis gear 73, in turn driven by the output shaft 74 of a side mounted motor 75 on the unit 22. The driven ring gear 72 carries a driving plate or ring 76 having an upturned annular flange 77 provided with four circumferentially spaced notches 78, FIG. 7, which receive auger drive rods 79 welded to the top edges of the auger flights 69 and extending radially and across the axis of rotor 67. The tips of the rods 79 engage in the notches 78 of drive ring 76 to provide a positive drive for the auger rotor 67 and to suspend such rotor within the housing 63 with its weight borne by the rotational drive ring 76.

During the operation of the deep fryer, the rotor 67 of the product infeed unit 62 can be driven in a continuous mode, or intermittently, where the machine is to cook only a predetermined number of pieces of the food product. The before-mentioned gates 70 of the auger flights 69 are flat quadrant gates each having a pivot rod 80 welded along one radial edge thereof and a parallel actuator rod 81 in the nature of a half-round rod welded to the lower side of each gate and having an interior cylindrical end portion 81'. The end portions 81' of actuators 81, FIGS. 9, 10 and 12, extend through clearance slots 82 formed in the lower end of tubular shaft 68 when the four gates 70 are in their elevated closed positions. The pivot rods 80 of the gates 70 have their inner end portions journaled in radial openings 83 of the tubular shaft 68 and their outer end portions journaled in bearings 84 of the auger structure.

Figure 9:
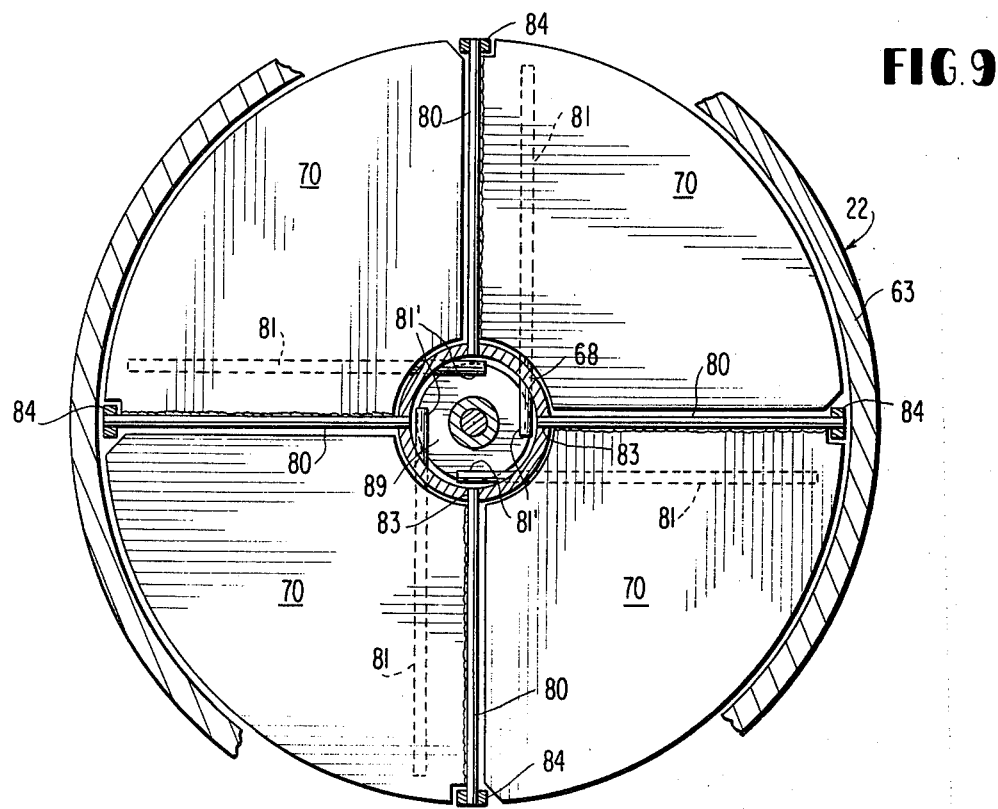
FIG. 9 is a horizontal section taken on line 9—9 of FIG. 6.

In the lower portion of the rotor shaft 68 is mounted a gate operator 85 in the form of a sleeve mounted on a central axial pin 86 having an upper thrust plate 87 secured thereto by a cross pin 88 and a lower end head 89 similarly secured to the pin 86 by a cross pin 90. The operator 85 has four circumferentially equidistantly spaced longitudinal guide grooves 91 formed in its exterior and receiving therein short guide pins 92 fixed in radial openings of the shaft 68 near and above the level of the pivot rods 80. The guide pins 92 also serve to retain compression spring 93 between the bottom of the thrust plate 87 and a spring-seating washer 94 which rests on the pins 92. The actuator rod extensions 81', as best shown in FIGS. 9 and 12, engage over the top face of head 89 and between such face and an opposing shoulder 95 of the operator 85. The compression spring 93 biases the operator 85 toward the closed gate position, FIG. 10, where the four gates 70 are held in level positions so as to cover the food product outlet passages 96 between adjacent flights of the feed auger 69, FIG. 13.

Figures 6, 7:
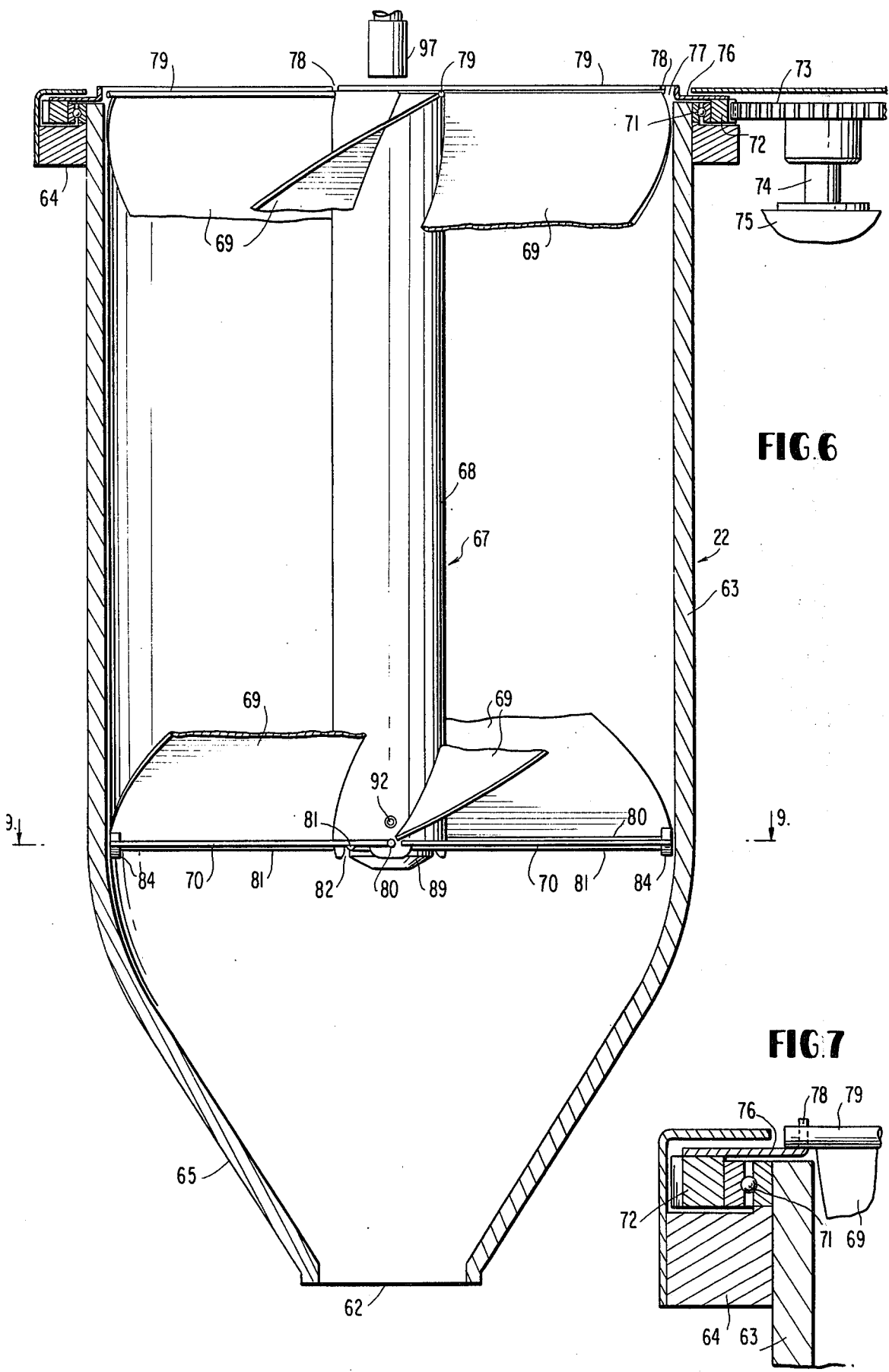
FIG. 6 is a central vertical section through a product infeed unit forming a part of the deep fryer and associated rotational drive means.
FIG. 7 is an enlarged fragmentary vertical section through the infeed unit showing the drive coupling of the feed auger with the rotationally driven element of the infeed unit.

To open these passages so that the product P, FIGS. 13 and 14, can be delivered into each cooking basket 27 at the first cooking station through the outlet 62, a linear actuator 97 shown in phantom lines in FIG. 12 and also shown in FIG. 6 moves downwardly and engages the top of thrust plate 87 to depress the gate operator 85 against the force of spring 93 to the position shown in FIG. 12. When this occurs, the gate actuator rod extensions 81' are cammed downwardly and the four gates 70 are swung downwardly on their pivot rods 80 to steeply inclined product discharge positons shown in FIGS. 12 and 14.

A unique feature of the product infeed unit resides in the angularities of the auger flights 69 and gates 70 to the horizontal when the gates are open. The slope of the gates 70 is such that the product P will slide therefrom by gravity and be discharged through the outlet 62 into the proper basket 27. The lesser slope of the flights 69 is such that the product P above the gates 70 will not slide and will be retained at the time of discharge. The advantage of this arrangement is that when the gates 70 return to their level closed position under influence of the spring 93, after raising the actuator 97, the gates will not crush the product. By properly coordinated driving of the rotor 67 of the infeed unit 22 and opening and closing of the gates 70, controlled amounts of the product, such as french fries, are introduced into the top of each basket 27 at the first cooking position, FIG. 3, when the cooking baskets are at a dwell.

As previously noted, the baffle 30 of each basket 27 and the adjacent walls 31 and 32 form a restricted vertical passage for incoming raw food products directly below the outlet 62 of the infeed unit 22. When the raw food is dropped into these passages by the opening of gates 70, it will impinge on the steeply inclined bottom wall portions 33 of the baskets and will be deflected radially outwardly in each basket toward the side wall of the cooking vessel 21, and well outwardly of the deflector 30. The product will tend to float in the cooking oil of the vessel 21 and will have no tendency to migrate back into the vertical passage defined by the baffle 30. Thus, there will be no blockage in this passage of incoming raw food product.

It may be noted here that the linear actuator 97 can be the rod of a pneumatic or hydraulic cylinder which is permanently fixed to the main frame 20 in alignment with the bore of tubular rotor shaft 68 containing the gate operator 85.

As mentioned previously, another notable feature of the invention is the provision of a sanitary enclosure for the deep fryer which will not interfere with the operation of moving components or the overall convenience of the machine but will prevent possibly contaminated cooking vapors which have escaped from the fryer from returning into the same. This enclosure means shown in FIGS. 1, 2, 4 and 5 comprises first and second sections 98 and 99, each including a horizontal cover plate 100 and 101 extending over the top of the cooking vessel 21 and sealed thereto by a high temperature seal, not shown. A dome extension 102 on enclosure section 98 has vertical screen panels 103 for the escape of cooking vapors to the outside of the machine in a horizontal path so that condensed vapors are unable to return to the cooking vessel 21 and wipings produced at clean-up cannot readily return. Similarly, above the final cooking station adjacent to the retriever basket 38 and viewing window 60, another dome portion 104 is provided on the enclosure section 99 and this dome portion also has vertical screen mesh panels 105 through which cooking vapors may flow horizontally to escape from the machine but cannot readily return after condensation. Any condensed vapors outside of the machine will simply run down the vertical screen panels and settle harmlessly on the horizontal cover plates 100 and 101.

It is believed that all of the important features of the invention have been described and the advantages of the invention over the prior art will be apparent to those skilled in the art. The construction and mode of operation of the deep fryer per se is simplified and convenient as well as economical, as is the construction and operation of the product infeed unit 22. In some cases, other forms of infeed units may be employed on the deep fryer in lieu of the particular unit 22 described herein. The unique enclosure including domed sections 98 and 99 with vertical screen panels prevents contamination of the deep fryer and eliminates a possible health hazard.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A deep fryer comprising a stationary vertical axis cylindrical cooking vessel, quadrant cooking baskets disposed in said vessel, intermittent rotor means for driving said baskets to cooking stations in said vessel and causing the baskets to dwell at said stations for a predetermined cooking time interval, each cooking basket having an open peripheral side in close proximity to the cylindrical side wall of the cooking vessel and covered by said side wall when the basket is in a lowered cooking position within the vessel, each basket having a sloping bottom wall leading toward said open peripheral side, a product retriever basket positioned at the final cooking station of said vessel exteriorly of the vessel side wall, means to elevate and lower each cooking basket during a dwell of the same at the final cooking station whereby said open peripheral side of each basket rises above the vessel side wall and the cooked product slides by gravity down said inclined bottom wall and through said open side and into the top of the retriever basket, and means to feed a raw food product into the top of each cooking basket at the first cooking station.

2. A deep fryer as defined in claim 1, and said last-named means disposed above the level of said cooking vessel and having a product outlet, means to feed said product in a controlled manner toward said outlet, and means forming a vertical restricted raw product inlet passage within each cooking basket in alignment with said outlet and near the center of the cooking vessel.

3. A deep fryer as defined in claim 2, and each cooking basket having a steeply inclined bottom wall portion at the bottom of said vertical raw product inlet passage and serving to deflect the incoming raw product radially outwardly toward the side wall of said cylindrical vessel where the product will float in the cooking basket and will be blocked from re-entering said vertical inlet passage.

4. A deep fryer as defined in claim 3, and said means forming said vertical inlet passage comprising a vertical baffle on each cooking basket spaced somewhat radially outwardly from an interior vertical wall of each basket near the axial center of said cooking vessel.

5. A deep fryer as defined in claim 1, and said sloping bottom wall of each basket being perforated.

6. A deep fryer as defined in claim 1, and means to elevate and lower each cooking basket comprising a substantially horizontal lifting element on the top of each basket, a vertical linear actuator positioned at said final cooking station above said cooking vessel, and a lifter carried by said actuator and having a horizontal slot to receive the lifting element of each basket in succession at the final cooking station.

7. A deep fryer as defined in claim 1, and a sanitary enclosure for the top of said cooking vessel including a domed section adjacent to and extending above the final cooking station and said retriever basket and having vertical screen panels through which cooking vapors may escape in horizontal flow paths.

8. A deep fryer as defined in claim 7, and said enclosure further including a second domed section having vertical screen panels near the side of the cooking vessel diametrically opposite the retriever basket.

9. A deep fryer as defined in claim 7, and a vertically movable viewing window on the automatic deep fryer at the final cooking station and above said retriever basket, said domed section having a side opening at the level of said viewing window.

10. A deep fryer as defined in claim 1, and a common main support and enclosure for said cooking vessel, said retriever basket and said last-named means.

11. A deep fryer as defined in claim 10, and a drain pan on said common support beneath the retriever basket and supporting the retriever basket at a fixed elevation where the top of the retriever basket is substantially at the level of the top of the cooking vessel.

12. A deep fryer as defined in claim 10, and a sump for cooking oil in the bottom portion of said common support and enclosure and beneath the cooking vessel, the cooking vessel having a bottom strainer and a cooking oil drain means leading to said sump.

13. A deep fryer as defined in claim 1, and said last-named means including a vertical axis cylindrical housing, a rotary product feeder within said cylindrical housing, power means to drive the rotary product feeder, and said intermittent rotor means for driving said cooking baskets including a flexible drive shaft adapted to be extended near the side wall of said vertical axis cylindrical housing.

14. A deep fryer as defined in claim 13, and said intermittent rotor means further including an intermittent drive coupled with said flexible drive shaft, a rotor coupled with the lower end of the flexible drive shaft, a thrust bearing and bearing support for the rotor near the top of said cooking vessel, and said rotor comprising a center column positioned at the axial center of the cooking vessel and extending downwardly in the cooking vessel and having supporting means for the cooking baskets within the cooking vessel.

15. A deep fryer comprising a stationary cooking vessel, plural cooking baskets within said vessel, means to index the cooking baskets within the cooking vessel to plural cooking stations around the cooking vessel and to cause the baskets to dwell at said stations, each cooking basket having an open side normally covered by a wall of the cooking vessel when the basket is inside of the cooking vessel, a product retriever positioned externally of the cooking vessel at one cooking station, means to elevate each cooking basket at said one station adjacent to said retriever and thereby uncovering said open side of each cooking basket so that a cooked product therein can gravitate into said retriever at said one cooking station, and a raw product infeed unit positioned above the cooking vessel at another station to deliver a measured quantity of the raw product into each cooking basket at such station.

16. A deep fryer as defined by claim 15, and said raw product infeed unit comprising a stationary vertical axis housing having a lower end raw product outlet, an auger rotor in said housing above said outlet including plural auger flights, power means to drive said auger rotor, a pivoted gate at the lower end of each flight to regulate the downward passage of the raw product from the bottoms of the flights, and a reciprocating actuator means connected with said gates to swing them between closed and open positions.

17. A deep fryer as defined by claim 16, and said reciprocating actuator means including a spring biasing said gates toward closed substantially level positions at the bottoms of said flights to block the movement of the raw product downwardly from passages between the flights, said gates when swung by said actuator means to their open positions being more steeply inclined than said flights so that the raw product will slide from said open gates by gravity but will not tend to slide from said flights because of lesser inclination of said flights.

18. A deep fryer as defined by claim 17, and said flights and gates being four in number, said gates comprising flat quadrant plate elements which are individually hinged to said auger rotor along corresponding radial edges of the gates.

19. A deep fryer as defined by claim 17, and said reciprocating actuator means further comprising a vertically movable operator for said gates adapted to move against the force of said spring and being cammingly connected to said gates at points on the gates spaced laterally from their pivot axes.

20. A deep fryer as defined by claim 19, and said reciprocating actuator means further comprising a power-operated extensible and retractable member adapted to engage one end of said operator.

* * * * *